United States Patent
Yamada et al.

(10) Patent No.: US 9,717,034 B2
(45) Date of Patent: Jul. 25, 2017

(54) COMMUNICATION SYSTEM AND COMMUNICATION CONTROL METHOD

(71) Applicant: NEC Corporation, Tokyo (JP)

(72) Inventors: Yoshiyuki Yamada, Tokyo (JP); Makoto Fujinami, Tokyo (JP); Ippei Akiyoshi, Tokyo (JP); Yasuhiro Mizukoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 92 days.

(21) Appl. No.: 14/429,339

(22) PCT Filed: Sep. 20, 2013

(86) PCT No.: PCT/JP2013/005544
§ 371 (c)(1),
(2) Date: Mar. 18, 2015

(87) PCT Pub. No.: WO2014/045585
PCT Pub. Date: Mar. 27, 2014

(65) Prior Publication Data
US 2015/0201364 A1    Jul. 16, 2015

(30) Foreign Application Priority Data

Sep. 20, 2012  (JP) .................................. 2012-207619

(51) Int. Cl.
*H04W 40/12*  (2009.01)
*H04W 28/08*  (2009.01)
(Continued)

(52) U.S. Cl.
CPC .............. *H04W 40/12* (2013.01); *H04L 69/14* (2013.01); *H04W 28/08* (2013.01); *H04W 48/16* (2013.01);
(Continued)

(58) Field of Classification Search
CPC ...... H04L 69/14; H04W 28/08; H04W 36/12; H04W 40/12; H04W 48/16–48/17;
(Continued)

(56) References Cited

U.S. PATENT DOCUMENTS

2010/0272013 A1  10/2010  Horn et al.
2010/0278108 A1*  11/2010  Cho .................... H04W 76/022
                                                                    370/328
(Continued)

FOREIGN PATENT DOCUMENTS

JP   2011-097567 A   5/2011
JP   2011-135417 A   7/2011
(Continued)

OTHER PUBLICATIONS

International Search Report (ISR) (PCT Form PCT/ISA/210), in PCT/JP2013/005544, dated Nov. 5, 2013.
(Continued)

*Primary Examiner* — Timothy J Weidner
(74) *Attorney, Agent, or Firm* — Finnegan, Henderson, Farabow, Garrett & Dunner, L.L.P.

(57) ABSTRACT

A communication control method and a communication system are provided that realize traffic offload while reducing the processing load on a base station. A base station in a mobile network includes a gateway (PO-GW) for connecting a mobile terminal (UE) in the mobile network to a packet data network (PDN), and a control function (MME, DNS, HSS) of the mobile network allows the mobile terminal to access the gateway (PO-GW), in response to a request from the mobile terminal to connect to the PDN via the base station.

22 Claims, 14 Drawing Sheets

(51) Int. Cl.
*H04W 48/16* (2009.01)
*H04W 88/08* (2009.01)
*H04W 88/16* (2009.01)
*H04W 88/00* (2009.01)
*H04L 29/06* (2006.01)

(52) U.S. Cl.
CPC ......... *H04W 88/005* (2013.01); *H04W 88/08* (2013.01); *H04W 88/16* (2013.01)

(58) Field of Classification Search
CPC . H04W 76/04–76/041; H04W 88/005; H04W 88/08–88/10; H04W 88/16; H04W 88/182; H04W 92/06
See application file for complete search history.

(56) References Cited

U.S. PATENT DOCUMENTS

2011/0292896 A1* 12/2011 Yeuom ................. H04W 8/082
370/329

2012/0170454 A1* 7/2012 Takano ................. H04W 8/082
370/230

FOREIGN PATENT DOCUMENTS

| JP | 2012-504898 A | 2/2012 |
| WO | WO 2011/020624 A2 | 2/2011 |
| WO | WO 2011/021815 A2 | 2/2011 |
| WO | WO 2011/034173 | 3/2011 |
| WO | WO 2011/069119 | 6/2011 |

OTHER PUBLICATIONS

3GPP TR23.829 v10.0.0 (Mar. 2011).
3GPP TS23.401 v10.0.0 (Jun. 2010).
Extended European Search Report mailed Mar. 16, 2016, by the European Patent Office in counterpart European Patent Application No. 13839248.5.

* cited by examiner

COMMUNICATION SYSTEM AND COMMUNICATION CONTROL METHOD

TECHNICAL FIELD

The present invention relates to a communication system including a mobile network and, more particularly, to a communication system and a communication control method for connection to an external network.

BACKGROUND ART

In recent years, with the proliferation of so-called smartphones, Internet traffic of mobile terminals has been rapidly increasing, and the traffic offload technology for reducing the load on a mobile core network has become more and more important. Attention has centered particularly on a small-sized base station that supports a traffic offload function called LIPA (Local IP Access) or SIPTO (Selected IP Traffic Offload) (see PTL 1 and NPLs 1 and 2).

For example, according to NPL 1, 5.3 (Solution 2), OPM (Offload Processing Module) that has a NAT (Network Address Translation) function and a routing function is provided to a base station (eNB), and it is determined, based on a destination address or the like, which of a mobile core network and the NAT function uplink traffic should be routed to. This routing determination is made based on routing rules that are downloaded from a base station management system or the like, or preconfigured, and is not supposed to require particular processing of a mobile terminal. Moreover, PTL 2 describes a technology of offloading to the Internet via a femto AP (Access Point). Moreover, PTL 3 describes that a bearer dedicated for local breakout is established, whereby the destination of traffic from a mobile terminal is made to be the Internet.

[PTL 1] Japanese Patent Application Unexamined Publication No. 2011-135417
[PTL 2] Japanese Patent Application Unexamined Publication No. 2011-097567
[PTL 3] Japanese Patent Application Unexamined Publication No. 2012-504898
[NPL 1] 3GPP TR23.829 v10.0.0 (2011-03)
[NPL 2] 3GPP TS23.401 v10.0.0 (2010-06)

SUMMARY

Technical Problem

However, the traffic offload function mentioned in NPL 1 has the problem that since a base station performs a process of determining a transfer target for incoming traffic by using the routing rules, the configuration and operation of the base station need to be changed. It makes the base station control more complicated and the processing load thereon is increased. Similarly, PTL 2 also has the problem that since the femto AP changes the header of an IP packet by performing IP address translation and NAT, the configuration and operation of a base station need to be changed. It makes the base station control more complicated and the processing load thereon is increased.

Moreover, as for PTL 3, local breakout is performed by a manual instruction from a user of the mobile terminal, or by presetting a connection preference on a mobile terminal. Therefore, it is necessary to operate a mobile terminal or to make a special setting on a mobile terminal.

Accordingly, an object of the present invention is to provide a communication system and a communication control method that achieve a connection to an external network while reducing the processing load on a mobile terminal and a base station.

Solution to Problem

A communication system according to the present invention is characterized by comprising: a base station that includes a gateway for connecting a mobile terminal to an external network; and a mobile network that includes a control function provision means for allowing the mobile terminal to access the gateway, in response to a request from the mobile terminal to connect to the external network via the base station.

A communication control method according to the present invention is a communication control method for a communication system, characterized by comprising: providing a base station with a gateway for connecting a mobile terminal in the mobile network to an external network; and by a control function provision means of the mobile network, allowing the mobile terminal to access the gateway, in response to a request from the mobile terminal to connect to the external network via the base station.

Advantageous Effects of Invention

According to the present invention, since a connection to an external network via a base station is achieved by control operation on a mobile network side, the load on a mobile terminal and a base station can be reduced.

DETAILED DESCRIPTION OF PREFERRED EMBODIMENTS

The present invention is to achieve a connection to an external network via a base station by changing control operation on a mobile network side and can eliminate not only the necessity to make a change to a user mobile terminal's setting but also the necessity of control at a base station, making it possible to reduce processing load.

As will be described later, a base station is provided with an offload gateway (hereinafter, referred to as PO-GW) having a function similar to a P-GW (Packet data network Gateway) that is present in a mobile network, but traffic offload control is performed on a mobile network side. More specifically, a mobile terminal is allowed to access the PO-GW not though control by a base station but through control by a mobile network, whereby traffic offload is achieved.

Hereinafter, an exemplary embodiment and examples of the present invention will be described with reference to drawings, where individual functions will be represented by the following signs.
UE: User Equipment (mobile terminal)
eNB: eNodeB (base station)
PO-GW: Packet Offload Gateway (gateway for packet offload)
S-GW: Serving Gateway (gateway for serving UEs located in its serving area)
P-GW: Packet data network Gateway (PDN gateway)
MME: Mobility Management Entity (mobility management node)
DNS: Domain Name System (name resolution system)
HSS: Home Subscriber Server (subscriber information management server)
PCRF: Policy and Charging Rules Function (policy and charging rules control node)
APN: Access Point Name (access point name)

1. Exemplary Embodiment 1.1) System Structure

Figure 1:
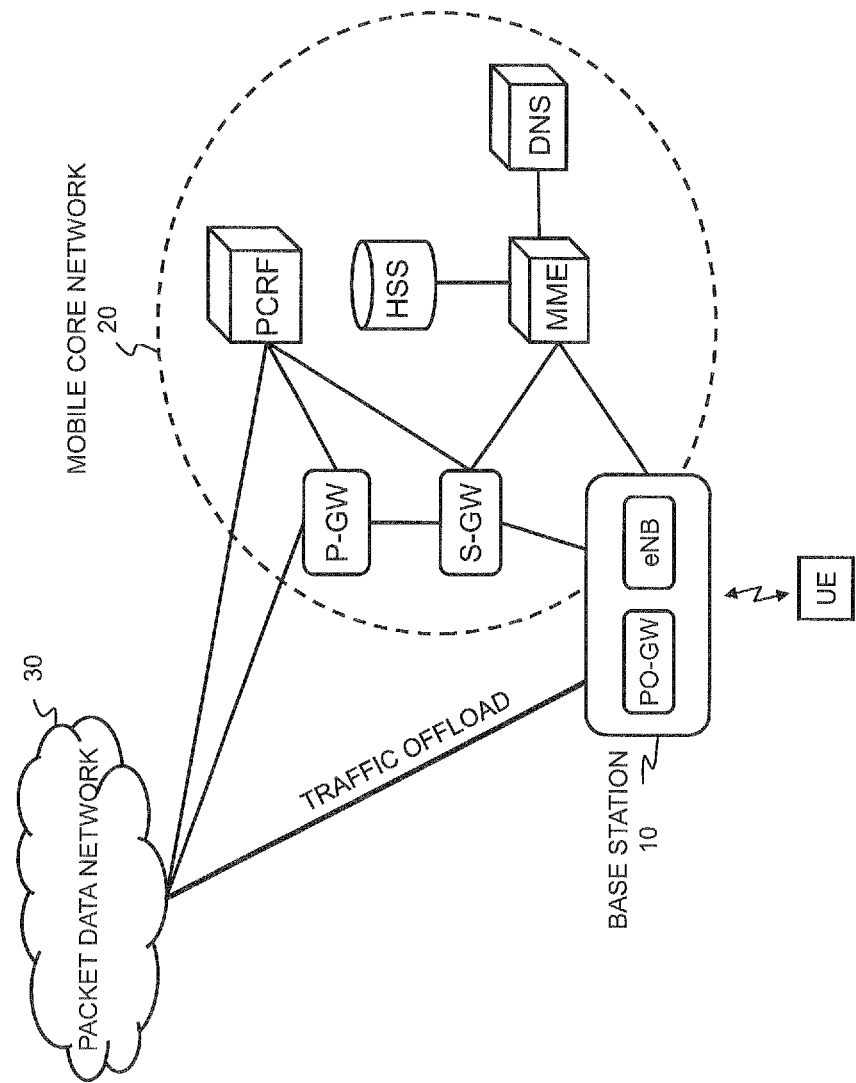
FIG. 1 is a network diagram showing a schematic structure of a communication system according to an exemplary embodiment of the present invention.

Referring to FIG. 1, a traffic offload control system according to a present exemplary embodiment includes a base station 10, a mobile core network 20, and a mobile terminal UE, and the base station 10 and the mobile core network 20 can connect to an external packet data network 30. The base station 10 has a PO-GW function and an eNB function, which will be described later, and the mobile core network 20 includes S-GW, P-GW, MME, DNS, HSS, and PCRF. The mobile terminal UE can connect to the external packet data network 30 via the P-GW of the mobile core network 20 but also can directly connect to the external packet data network 30 via the PO-GW of the base station 10 by changing operation on the network side, which will be described later. Hereinafter, the Internet will be used as an example of the external packet data network.

Figure 2:
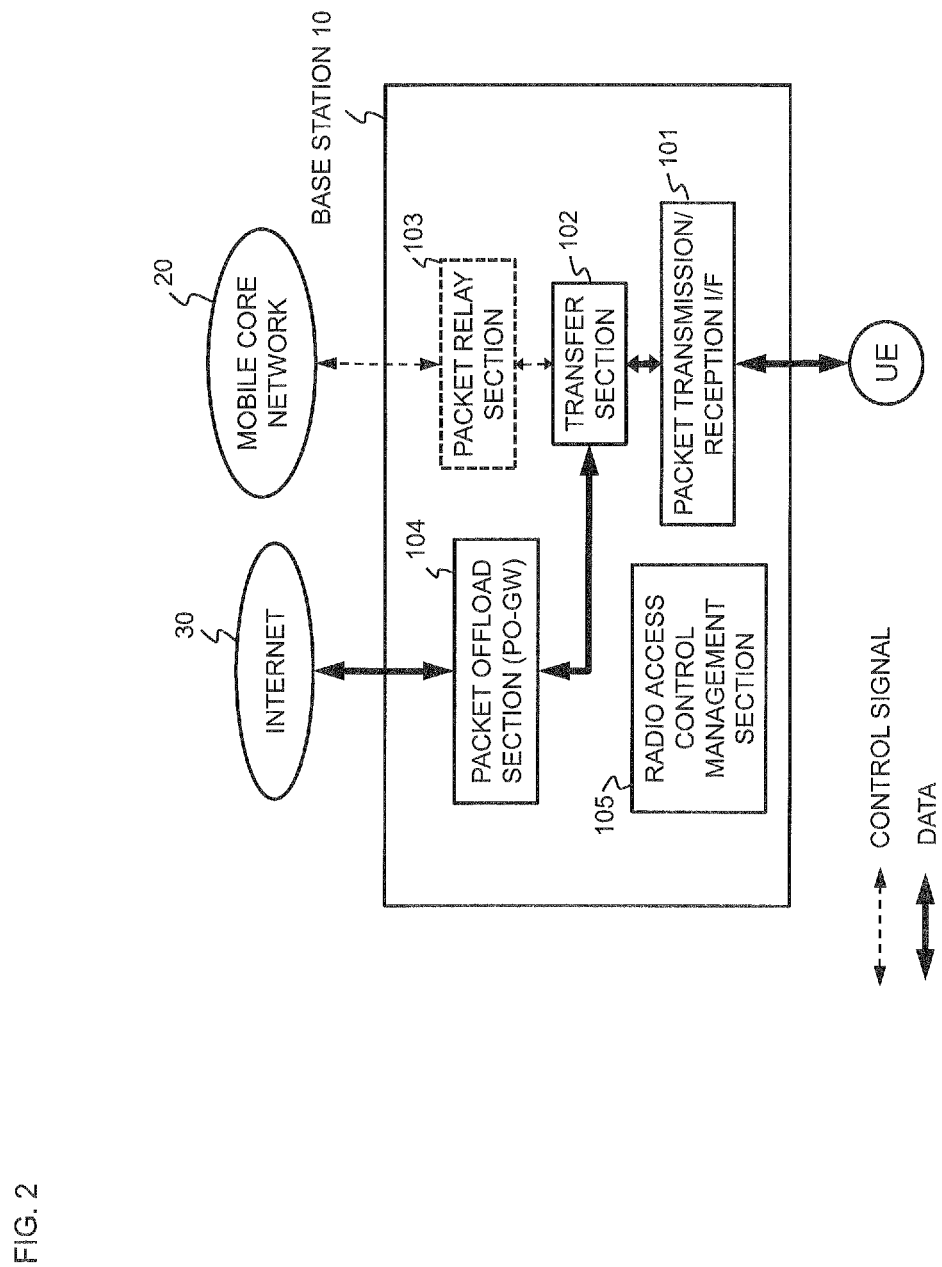
FIG. 2 is a block diagram showing a functional configuration of a base station used in the present exemplary embodiment.

FIG. 2 shows a partial functional configuration of the base station 10. The base station 10 includes a packet transmission/reception interface 101 that performs packet communication with the mobile terminal UE, a transfer section 102 that changes packet data paths at the time of packet offload, a packet relay section 103 that transmits and receives packets to/from the mobile core network 20, a packet offload section 104, and a radio access control management section 105. The eNB function of the base station 10 is implemented by the packet transmission/reception interface 101, the packet relay section 103, and the radio access control management section 105, while the PO-GW function is implemented by the transfer section 102 and the packet offload section 104. Note that the base station 10 is provided with a control section (not shown), which controls the entire operation of the base station.

The packet offload section 104 corresponds to the PO-GW, and the transfer section 102 transfers packet data to the packet offload section 104 at the time of offload, whereby traffic is flown to the Internet 30 and a reduction in the load on the mobile core network 20 is achieved. Note that the transfer section 102 and the packet offload section 104 are controlled by using control signals from the mobile core network 20, as shown in FIG. 2. It is assumed here that the fact that the base station 10 has the PO-GW function is known to the network side beforehand.

1.2) PDN Bearer Connection Control

Figure 3:
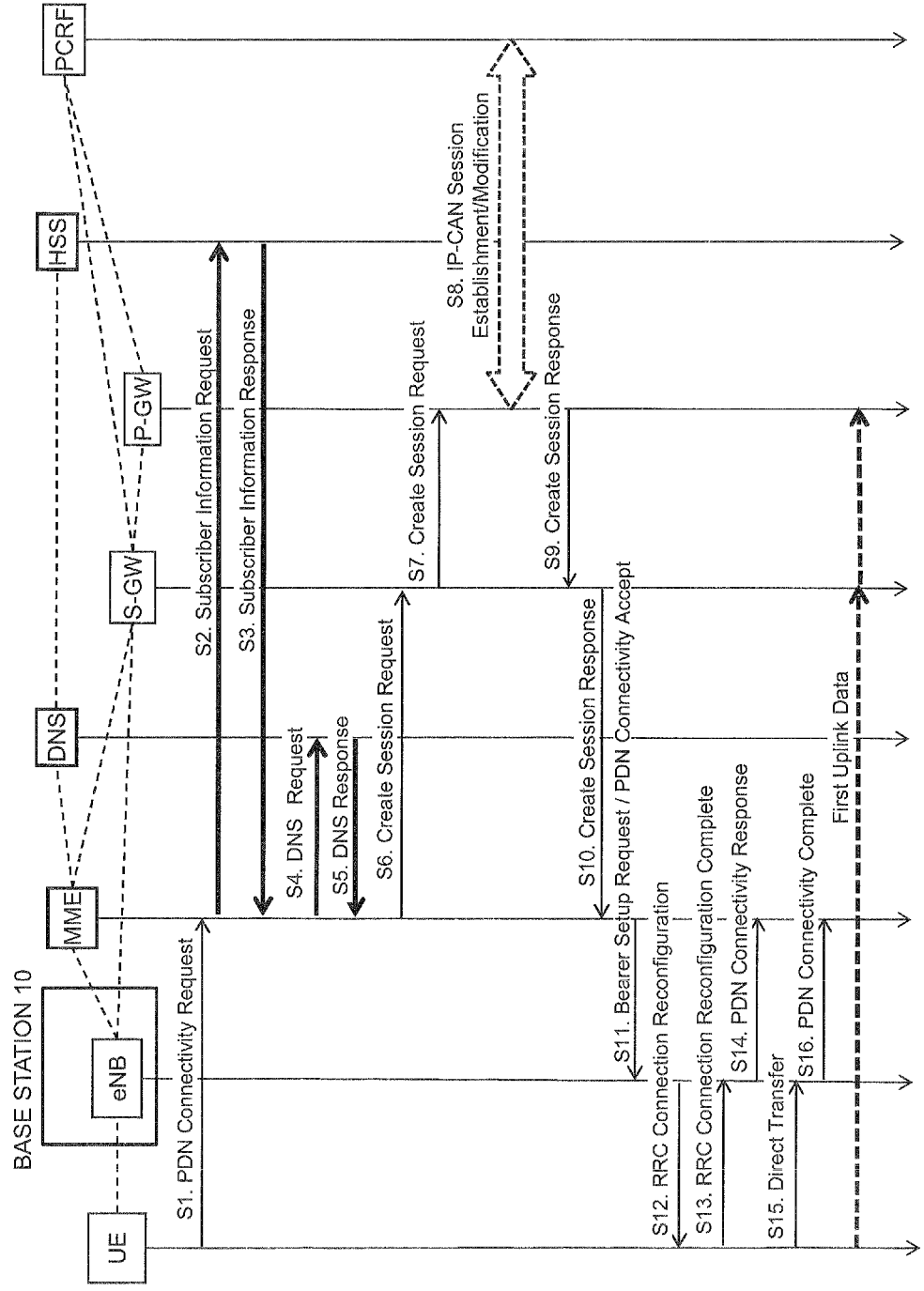
FIG. 3 is a sequence diagram showing PDN bearer connection control via a mobile core network in the present exemplary embodiment.
Figure 4:
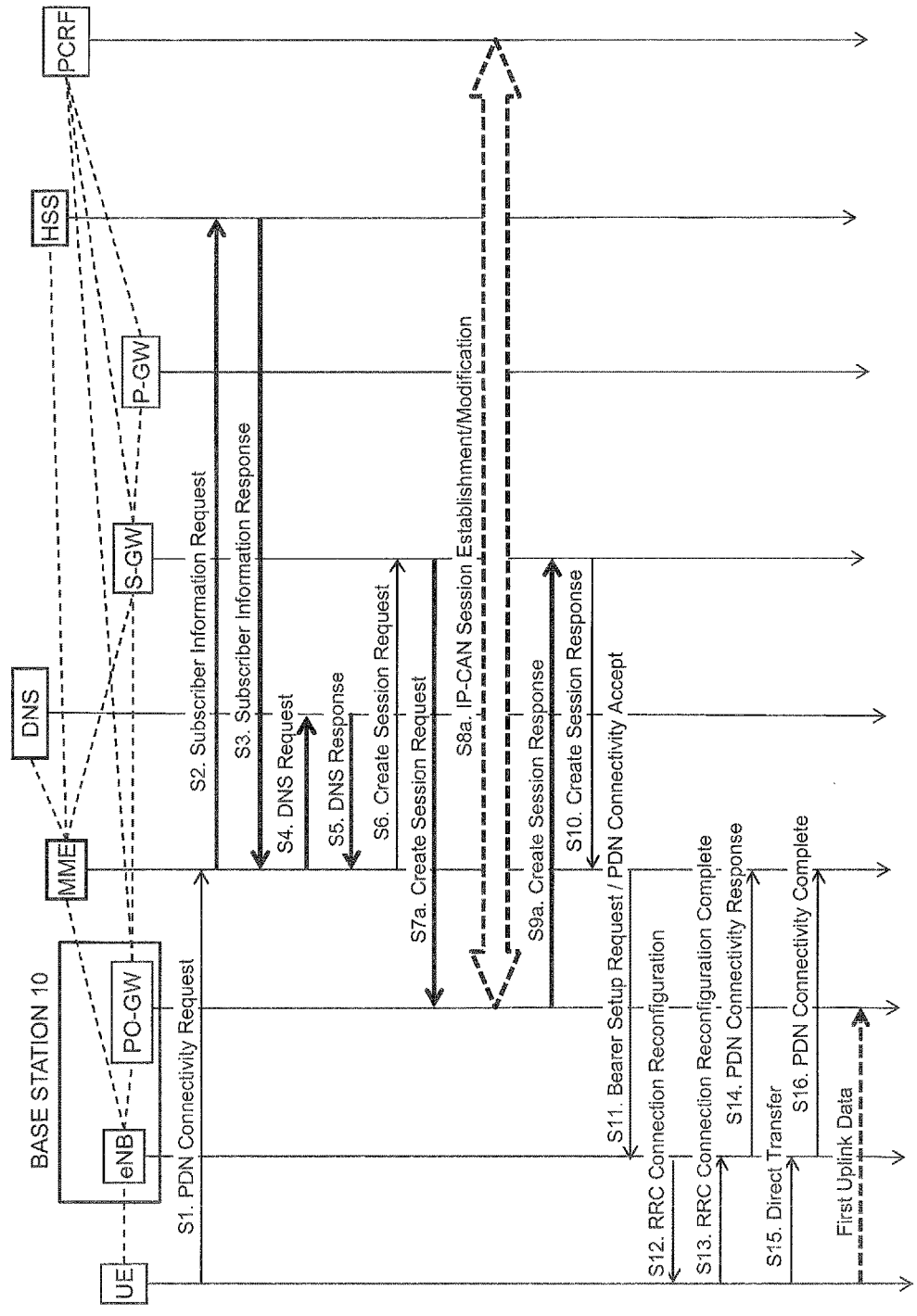
FIG. 4 is a sequence diagram showing PDN bearer connection control at the time of traffic offload in the present exemplary embodiment.

Next, an outline of traffic offload control according to the present exemplary embodiment will be described with reference to PDN bearer connection control sequences shown in FIGS. 3 and 4. FIG. 3 shows a PDN bearer connection control sequence in an existing LTE network, and FIG. 4 shows a PDN bearer connection control sequence at the time of offload, where a connection between the mobile terminal UE and the Internet 30 is achieved via the P-GW of the mobile core network 20 and the PO-GW of the base station 10, respectively. In terms of the operation of the base station, when the mobile terminal UE has accessed the PO-GW in accordance with control by the mobile core network 20, the transfer section 102 of the base station 10 changes packet data paths from the packet transfer section 103 to the packet offload section 104. However, respective operational steps of the PDN bearer connection control sequences in FIGS. 3 and 4 are different only in terms of P-GW or PO-GW and therefore are denoted by the same operation numbers S1 to S16.

In the PDN bearer connection control in the existing LTE shown in FIG. 3, first, the MME, upon receiving a PDN connectivity request message (PDN Connectivity Request) from the mobile terminal UE via the base station 10 (operation S1), sends a subscriber information request message (Subscriber Information Request) to the HSS (operation S2). Upon receiving a response message (Subscriber Information Response) thereto from the HSS (operation S3), the MME sends a DNS request message (DNS Request) to the DNS attached to itself (operation S4) and receives a response message (DNS Response) thereto (operation S5). In FIG. 3, the IP addresses of the S-GW and the P-GW, the targets with which a bearer is set, are selected.

Subsequently, the MME sends a session creation request message (Create Session Request) to the selected S-GW (operation S6), and the S-GW sends a session creation request message (Create Session Request) to the selected P-GW (operation S7). The P-GW, upon establishing or changing an IP-CAN (Connectivity Access Network) session with the PCRF (operation S8), returns a session creation response message (Create Session Response) to the S-GW (operation S9). Subsequently, the S-GW returns Create Session Response to the MME (operation S10). The MME, upon receiving the Create Session Response from the S-GW, sends a radio bearer setup request/PDN connectivity request acceptance message (Bearer Setup Request/PDN Connectivity Accept) to the eNB of the base station 10 (operation S11). Upon receiving the Bearer Setup Request/PDN Connectivity Accept, the eNB of the base station 10 sends a RRC connection reconfiguration message (RRC Connection Reconfiguration) to the mobile terminal UE (operation S12). The eNB, upon receiving a RRC connection reconfiguration completion message (RRC Connection Reconfiguration Complete) as a response thereto (operation S13), sends a PDN connectivity response message (PDN Connectivity Response) to the MME (operation S14). Further, the mobile terminal UE sends a direct transfer message (Direct Transfer) containing a PDN connectivity completion message (PDN Connectivity Complete) to the eNB (operation S15), and the eNB sends PDN Connectivity Complete to the MME (operation S16). In this manner, bearer setup through the mobile terminal UE to the P-GW via the eNB and the S-GW is completed. The then transfer section 102 of the base station 10 transfers packets between the packet transmission/reception interface 101 and the packet relay section 103.

On the other hand, in the PDN bearer connection control at the time of offload in FIG. 4, the MME, upon receiving a PDN connectivity request message (PDN Connectivity Request) from the mobile terminal UE via the base station 10 (operation S1), sends a subscriber information request message (Subscriber Information Request) to the HSS (operation S2). Upon receiving a response message (Subscriber Information Response) thereto from the HSS (operation S3), the MME sends a DNS request message (DNS Request) to the DNS attached to itself (operation S4) and receives a response message (DNS Response) thereto (operation S5). In FIG. 4, the IP addresses of the S-GW and the PO-GW, the targets with which a bearer is set, are selected.

Subsequently, the MME sends a session creation request message (Create Session Request) to the selected S-GW (operation S6), and the S-GW sends a session creation request message (Create Session Request) to the selected PO-GW (base station 10) (operation S7a). The PO-GW, upon establishing or changing an IP-CAN (Connectivity Access Network) session with the PCRF (operation S8a), returns a session creation response message (Create Session Response) to the S-GW (operation S9a). Subsequently, the S-GW returns Create Session Response to the MME (operation S10). The MME, upon receiving the Create Session Response from the S-GW, sends a radio bearer setup request/ PDN connectivity request acceptance message (Bearer Setup Request/PDN Connectivity Accept) to the eNB of the base station 10 (operation S11). Upon receiving the Bearer Setup request/PDN Connectivity Accept, the eNB of the base station 10 sends a RRC connection reconfiguration message (RRC Connection Reconfiguration) to the mobile terminal UE (operation S12). The eNB, upon receiving a RRC connection reconfiguration completion message (RRC Connection Reconfiguration Complete) as a response thereto (operation S13), sends a PDN connectivity response message (PDN Connectivity Response) to the MME (operation S14). Further, the mobile terminal UE sends a direct transfer message (Direct Transfer) containing a PDN connectivity completion message (PDN Connectivity Complete) to the eNB (operation S15), and the eNB sends PDN Connectivity Complete to the MME (operation S16). In this manner, bearer setup through the mobile terminal UE to the PO-GW via the eNB is completed. The then transfer section 102 of the base station 10 transfers packets between the packet transmission/reception interface 101 and the packet offload section 104.

1.3) Methods for Implementing Offload

According to the present exemplary embodiment, to implement the traffic offload shown in FIG. 4, it is sufficient to set an IP address that will ultimately serve as a PDN gateway for the PO-GW at any one of the operations S2 to S5 in the PDN bearer connection control sequence. This offload can be implemented by the following three methods, for example.

Offload method A: For a function of the DNS, a function is added of returning to the MME an IP address (P-GW or PO-GW) to serve as a PDN gateway, based on the identification information ID of a base station to which the mobile terminal UE has requested to attach.

Offload method B: For a function of the MME, a function is added of determining a PDN gateway to connect to, based on attribute information indicative of a base station with PO-GW and on location information. For example, the MME selects the IP address of the P-GW/PO-GW, based on information such as attribute information and location information, from an address list of P-GW and PO-GW received from the DNS at the operation S5 in the sequences shown in FIGS. 3 and 4.

Offload method C: For a function of the HSS, a function is added of changing information of a PDN gateway to connect to, based on attribute information indicative of a base station with PO-GW. For example, at the time of inquiring of the HSS at the operation S2 in the sequences FIGS. 3 and 4, the HSS receives attribute information from the MME and returns to the MME a response in which a default PDN is set for the IP/APN of the P-GW/PO-GW.

Hereinafter, these offload methods A to C will be described in detail with reference to FIGS. 5 to 13.

2. Offload Method A (First Example)

Figure 5:
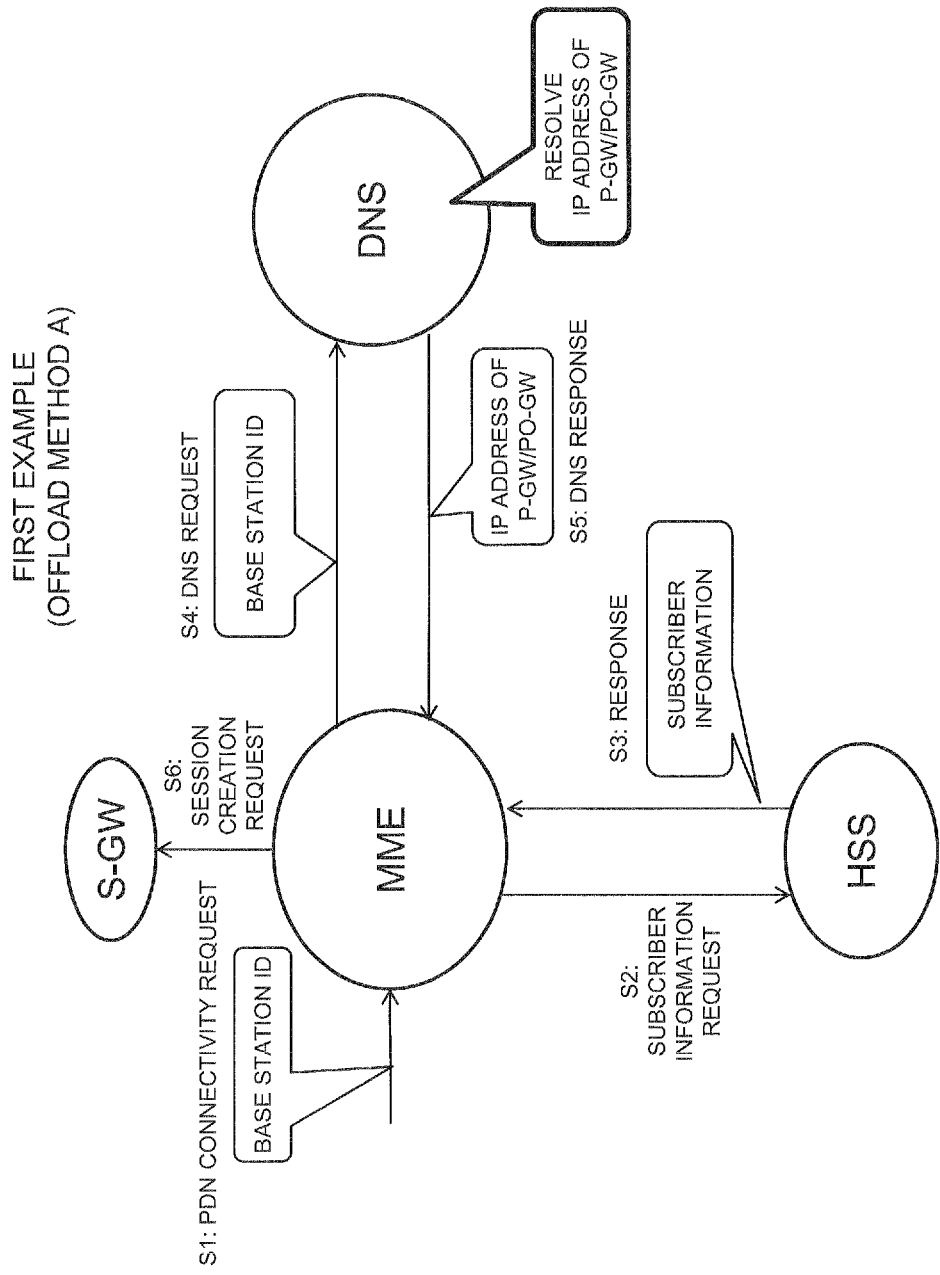
FIG. 5 is a partial sequence diagram to describe operation in a communication system according to a first example of the present invention.

FIG. 5 shows a partial sequence of the offload method A, which is a first example of the present invention. Individual sequence operations are identical to the operations S1 to S6 in FIGS. 3 and 4, and therefore the same reference signs are used. In the present example, a function of determining to permit offload is added to the HSS, and a function of resolving the IP address of a PDN gateway based on the identification information ID of a base station is added to the DNS.

A.1) Offload Control

Referring to FIG. 5, the MME, upon receiving a PDN connectivity request message containing a base station ID from the mobile terminal UE (operation S1), sends a subscriber information request message to the HSS (operation S2) and, in response thereto, receives a response message containing subscriber information (operation S3). Subsequently, the MME sends a DNS request message containing the base station ID to the DNS (operation S4). Note that the response message at the operation S3 and the DNS request message at the operation S4 may also contain offload permission information, which will be described later. The DNS, considering the base station ID, resolves the IP address of a PDN gateway and sends a response message containing it to the MME (operation S5). The MME sends to the S-GW a session creation request message containing the IP address to serve as a PDN gateway with which a bearer is set (operation S6), and thereafter the sequence operations S7 to S16 as described already are performed.

The DNS has a function of resolving the IP address of a PDN gateway in consideration for a base station ID, whereby for the mobile terminal UE requesting to attach to the base station 10 with PO-GW, it is possible to determine that the PO-GW of the base station 10 will serve as a PDN gateway and thus to perform traffic offload. On the other hand, for the mobile terminal UE requesting to attach to a base station without PO-GW, it is determined that the P-GW of the mobile core network 20 will serve as a PDN gateway, and no traffic offload is performed.

A.2) Configuration

To implement the above-described offload control on the network side, functions as described below are added to the HSS and the DNS. However, the following example is assumed to include an offload permission function.

Figure 6:
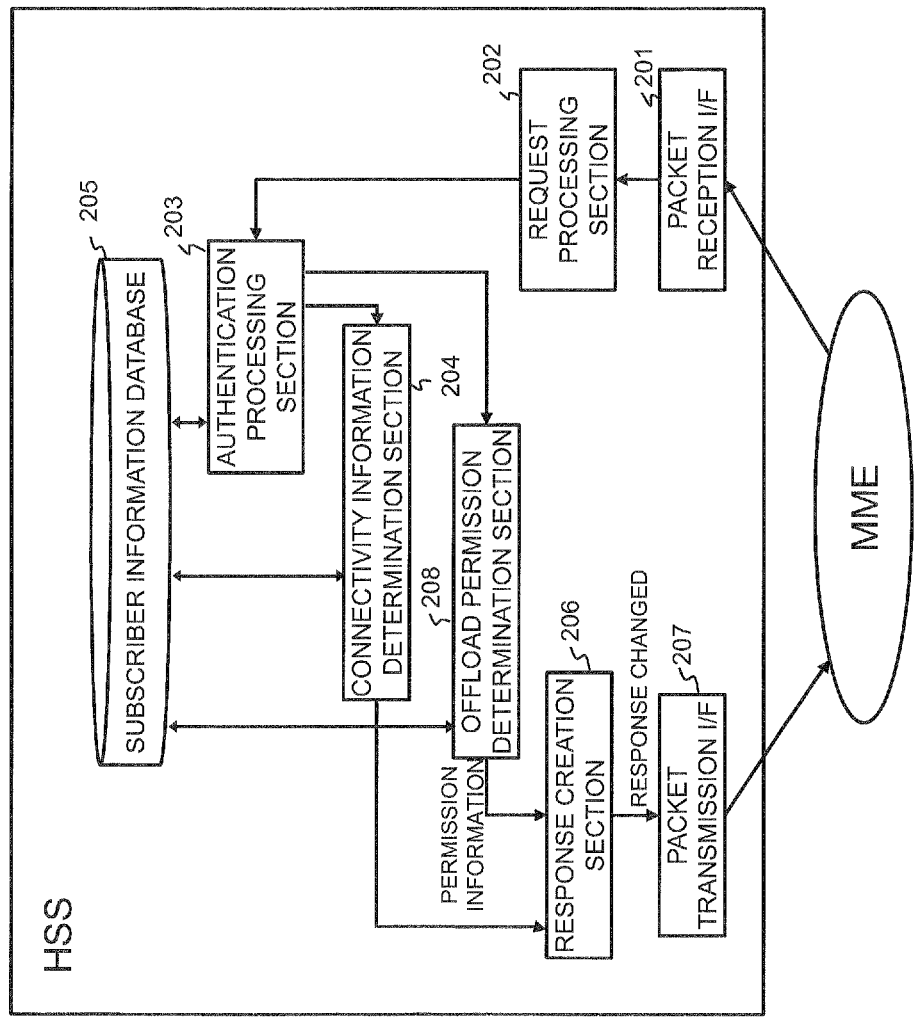
FIG. 6 is a block diagram showing a schematic functional configuration of a home subscriber server (HSS) in the communication system according to the first example.

Referring to FIG. 6, the HSS has an offload permission determination section 208 in addition to ordinary functions. The ordinary functions are implemented by a packet reception interface 201, a request processing section 202, an authentication processing section 203, a connectivity information determination section 204, a subscriber information database 205, a response creation section 206, and a packet transmission interface 207 and perform management of authentication information, serving information, and the like by using the subscriber information database 205. The offload permission determination section 208 in the present example determines whether or not offload is permitted, based on the subscriber information of the mobile terminal UE, and embeds information about the offload permission in a response message to return to the MME. Such offload permission information is added for each mobile terminal UE, whereby it is possible to reflect a user's desire. When offload is not desired, it is possible to connect to the Internet via the P-GW of the mobile core network 20.

Figure 7:
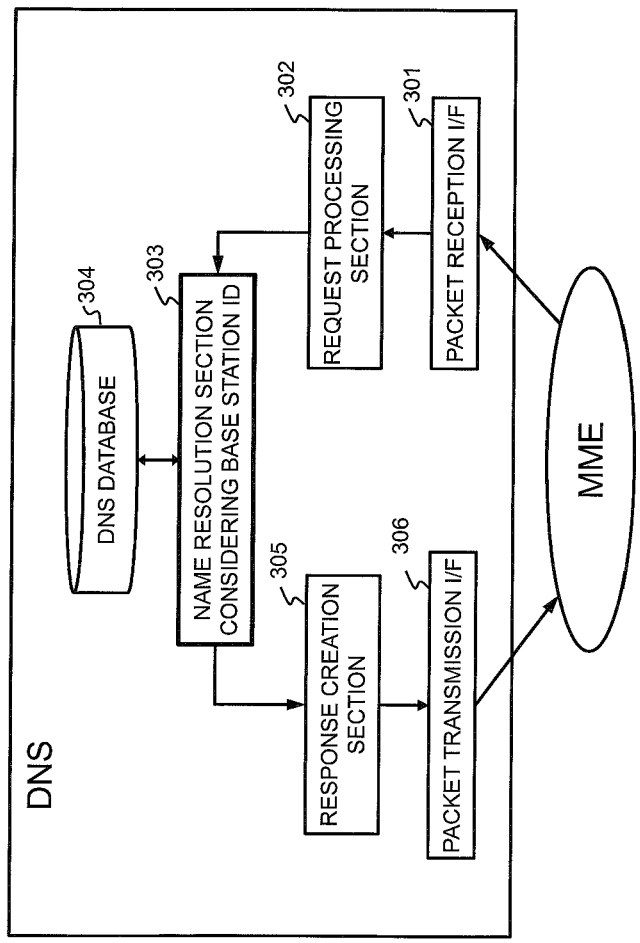
FIG. 7 is a block diagram showing a schematic functional configuration of a domain name server (DNS) in the communication system according to the first example.

Referring to FIG. 7, the DNS is provided with a packet reception interface 301, a request processing section 302, a name resolution section 303, a DNS database 304, a response creation section 305, and a packet transmission interface 306 and is different from an existing DNS in that the name resolution section 303, which is provided in place of a name resolution section of the existing DNS, performs name resolution in consideration for a base station ID. Operation of the name resolution section 303 is as follows.

A.3) Name Resolution in Consideration for Base Station ID

Figure 8:
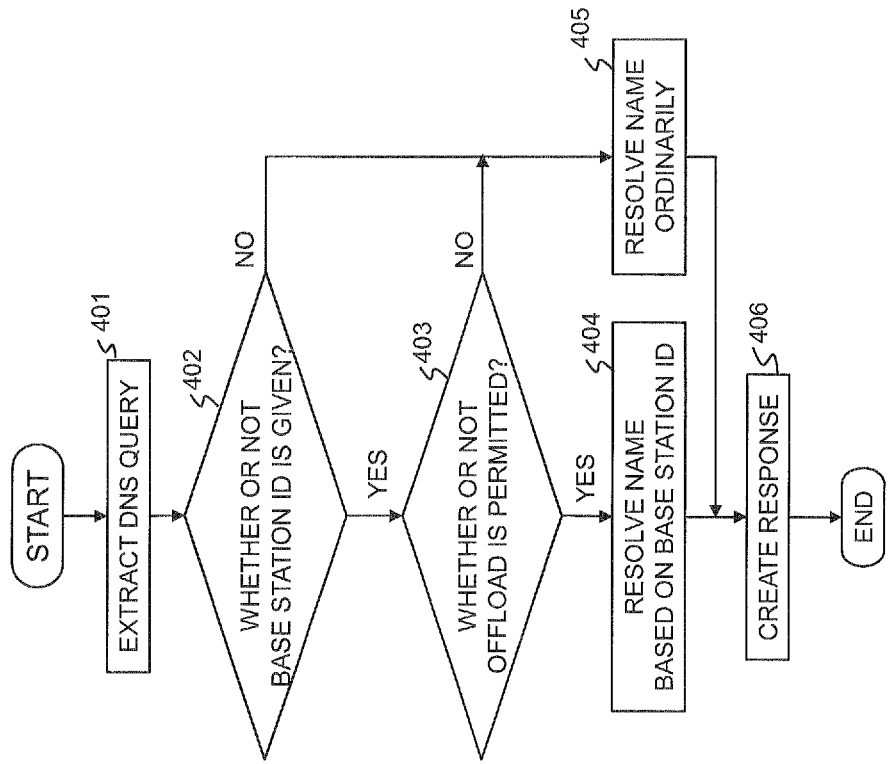
FIG. 8 is a flowchart showing operation of the DNS depicted in FIG. 7.

Referring to FIG. 8, the request processing section 302 extracts a DNS query from a DNS request message received from the MME (operation 401), and then the name resolution section 303 determines whether or not a base station ID is given to the DNS query (operation 402). If a base station ID is given (operation 402: YES), subsequently it is determined whether or not offload is permitted (operation 403). If offload is permitted (operation 403: YES), the name resolution section 303 refers to the DNS database 304 and performs name resolution based on the base station ID (operation 404). When a base station ID is not given (operation 402: NO), or when offload is not permitted (operation 403: NO), then ordinary name resolution is performed (operation 405). The response creation section 305 creates a response message using an IP address thus resolved (operation 406) and sends it to the MME through the packet transmission interface 306.

In this manner, for the mobile terminal UE requesting to attach to the base station 10 with PO-GW, if offload is permitted in its subscriber information, the IP address of the PO-GW of the base station 10 is resolved, whereby it is possible to perform traffic offload. On the other hand, for the mobile terminal UE requesting to attach to a base station without PO-GW, the IP address of the P-GW of the mobile core network 20 is resolved, and no traffic offload is performed. However, the offload permission function does not need to be provided.

3. Offload Method B (Second Example)

Figure 9:
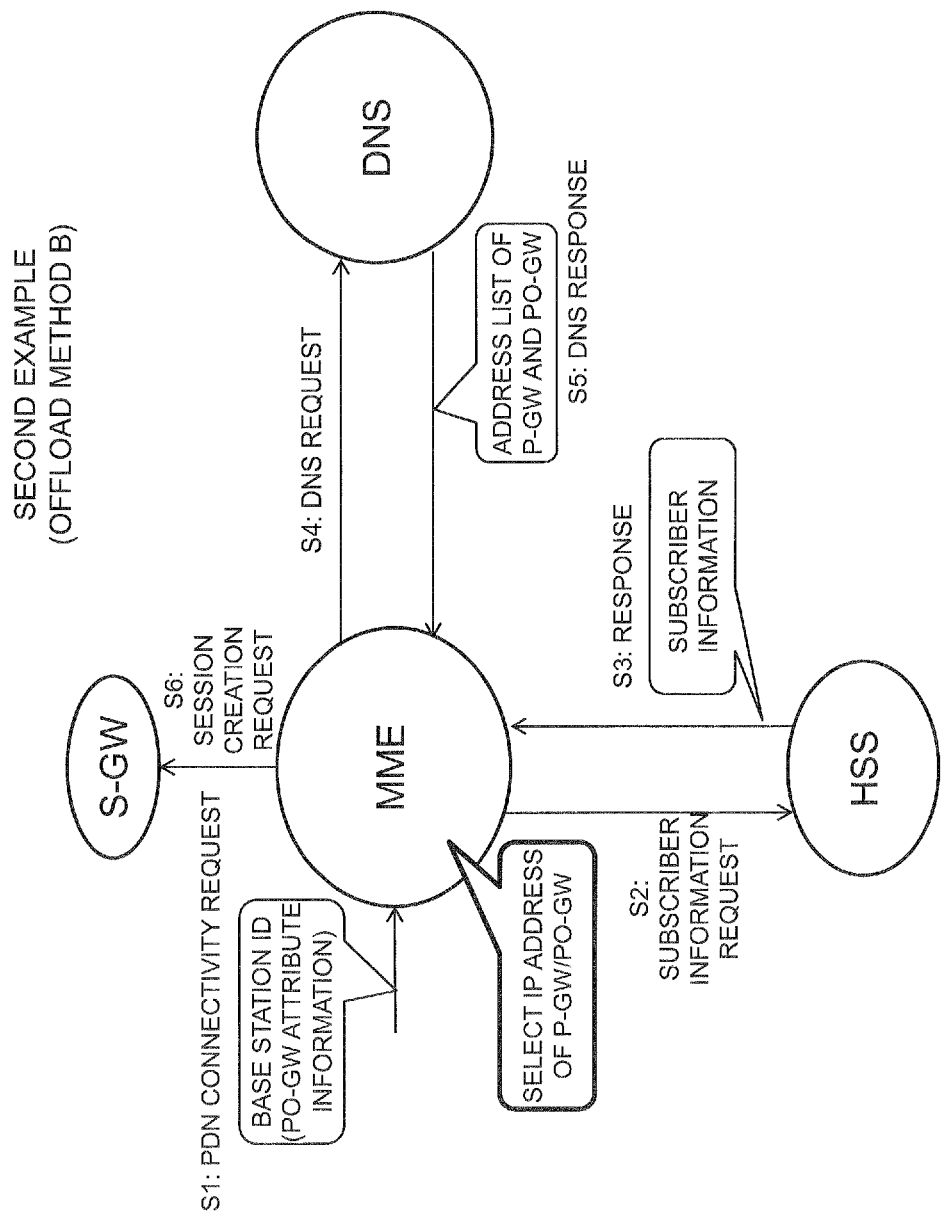
FIG. 9 is a partial sequence diagram to describe operation in a communication system according to a second example of the present invention.

FIG. 9 shows a partial sequence of the offload method B, which is a second example of the present invention. Individual sequence operations are identical to the operations S1 to S6 in FIGS. 3 and 4, and therefore the same reference signs are used. In the present example, a function of determining to permit offload is added to the HSS, and a function of determining a PDN gateway is added to the MME.

B.1) Offload Control

Referring to FIG. 9, the MME, upon receiving a PDN connectivity request message containing a base station ID from a base station to which the mobile terminal UE has requested to attach (operation S1), sends a subscriber information request message to the HSS (operation S2) and, in response thereto, receives a response message containing subscriber information (operation S3). Note that the response message at the operation S3 may also contain offload permission information, which will be described later. Subsequently, the MME sends a DNS request message to the DNS (operation S4) and receives from the DNS a response message containing an address list of P-GW and PO-GW to serve as a PDN gateway (operation S5). If the PDN connectivity request message from the base station contains PO-GW attribute information, then the MME, based on the PO-GW attribute information, selects from the address list of P-GW and PO-GW the IP address of a PDN gateway with which a bearer is set, and sends a session creation request message to the S-GW (operation S6). Thereafter, the sequence operations S7 to S16 as described already are performed. Note that the PO-GW attribute information is information based on which it can be determined whether or not the base station that has sent the PDN connectivity request message has a PO-GW, and the base station ID, the base station's location information, or the like can be used for it. Here, the location information is information on the base station indicated by, for example, latitude and longitude, or the like. More specifically, it is sufficient that the information makes it possible to determine whether the base station that is present at a specific location (e.g., latitude X and longitude Y) is a base station with PO-GW or a base station without PO-GW.

In this manner, according to the present example, the MME selects the IP address of a PDN gateway from the address list of P-GW and PO-GW, based on the PO-GW attribute information. Thereby, for the mobile terminal UE requesting to attach to the base station 10 with PO-GW, it is possible to determine that the PO-GW of the base station 10 will serve as a PDN gateway and thus to perform traffic offload. On the other hand, for the mobile terminal UE requesting to attach to a base station without PO-GW, it is determined that the P-GW of the mobile core network 20 will serve as a PDN gateway, and no traffic offload is performed.

B.2) Configuration

To implement the above-described offload control on the network side, in addition to the already-described function added to the HSS (see FIG. 6), a function as described below is added to the MME. However, the following example is assumed to include an offload permission function.

Figure 10:
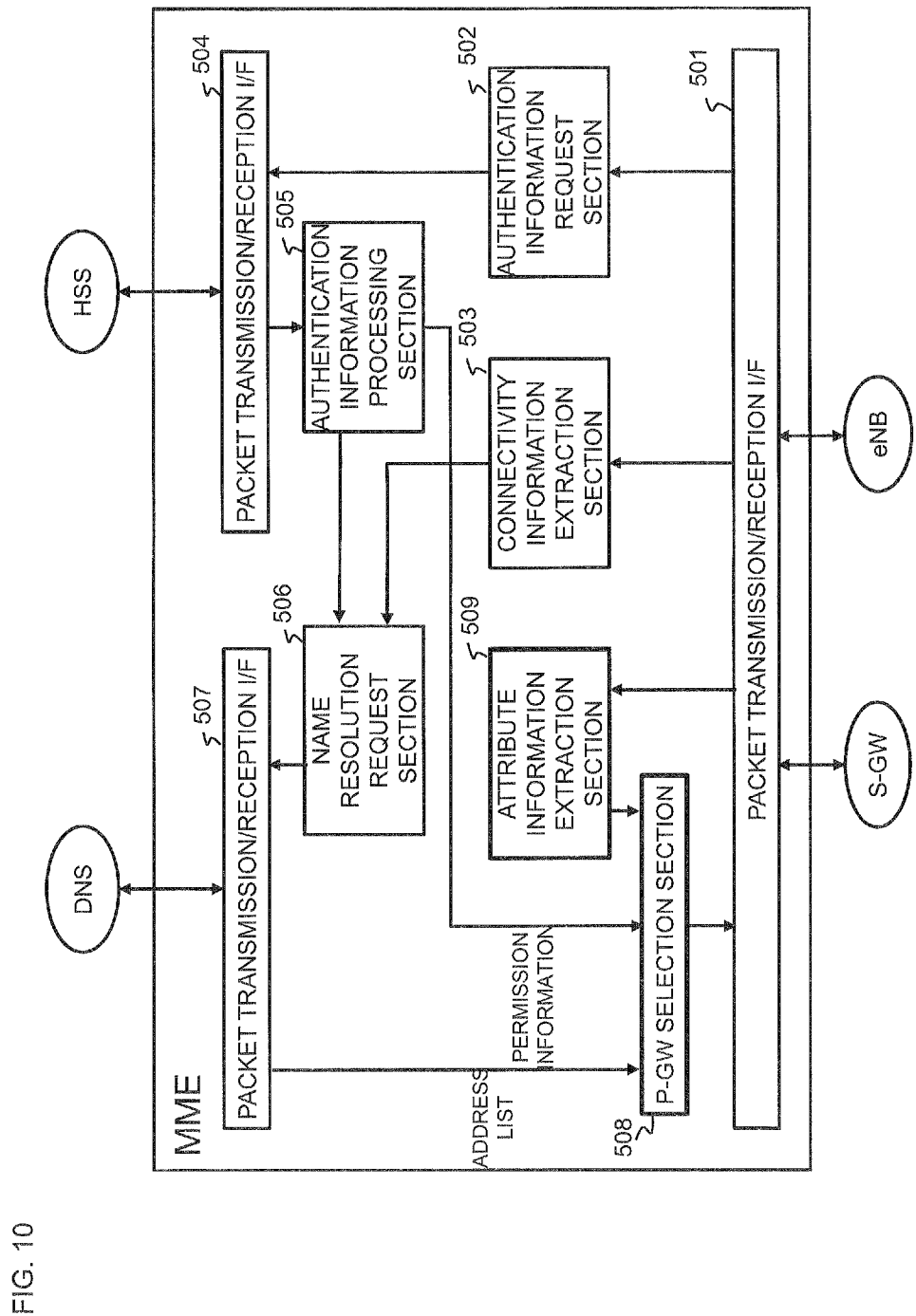
FIG. 10 is a block diagram showing a schematic functional configuration of a mobility management entity (MME) in the communication system according to the second example.

Referring to FIG. 10, an attribute information extraction section 509 is added to the MME in addition to ordinary functions, and a P-GW selection section 508 selects a PDN gateway in consideration also for attribute information. The MME includes a packet transmission/reception interface 501 for performing packet communication with the eNB and the S-GW, an authentication information request section 502, a connectivity information extraction section 503, a packet transmission/reception interface 504 for performing packet communication with the HSS, an authentication information processing section 505, a name resolution request section 506, a packet transmission/reception interface 507 for performing packet communication with the DNS, the P-GW selection section 508, and the attribute information extraction section 509.

The attribute information extraction section 509, if PO-GW attribute information is contained in a PDN connectivity request from the eNB, then extracts and outputs it to the P-GW selection section 508. The PO-GW attribute information is information indicating whether or not a base station to which the mobile terminal UE has requested to attach has a PO-GW. The P-GW selection section 508 selects a PDN gateway from an address list received from the DNS, by using offload permission information from the HSS and the PO-GW attribute information. P-GW selection operation of the MME is as follows.

B. 3) P-GW Selection Operation

Figure 11:
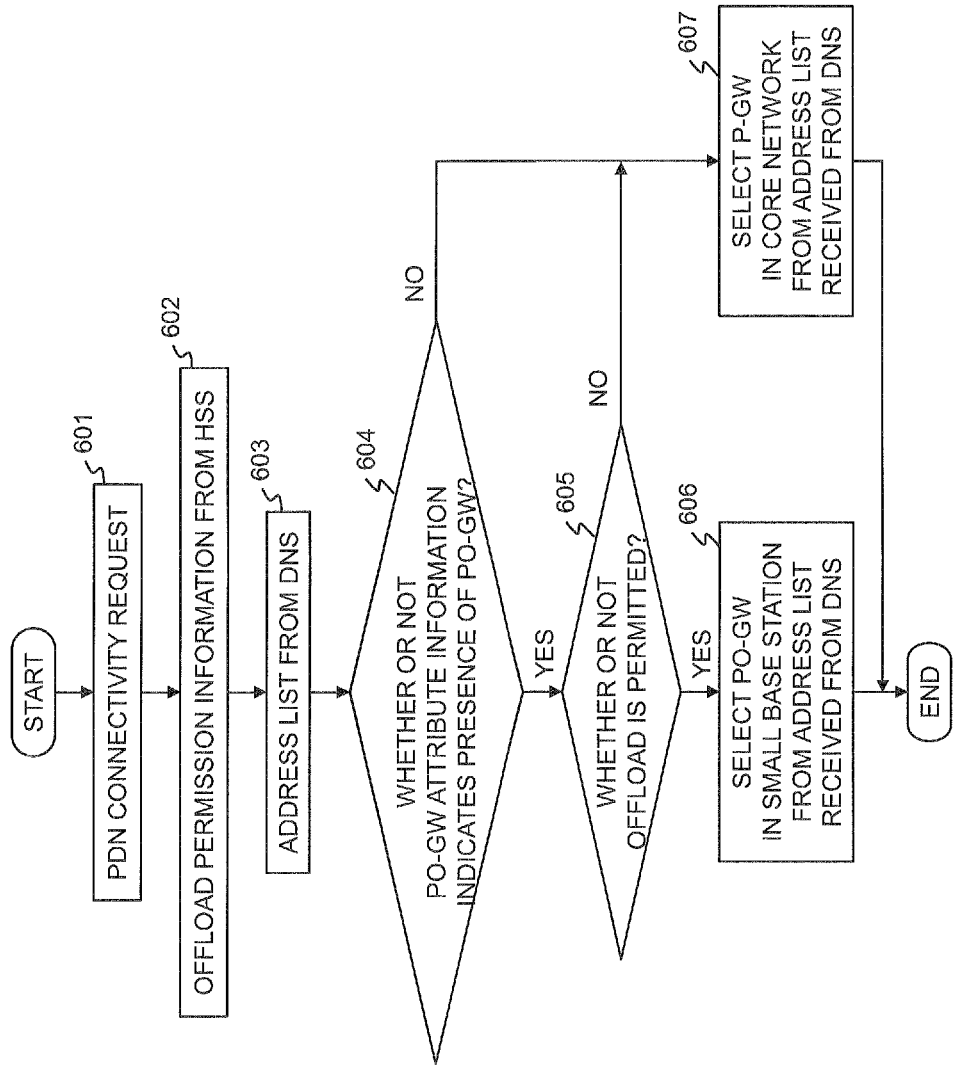
FIG. 11 is a flowchart showing operation of the MME depicted in FIG. 10.

Referring to FIG. 11, when the MME receives a PDN connectivity request from the eNB (operation 601), then through the above-described operations S2 to S5, the authentication information processing section 505 extracts offload permission information from a result of user authentication by the HSS (operation 602), and receives an address list through a DNS response message responding to a DNS request message made by the name resolution request section 506 (operation 603).

Subsequently, the P-GW selection section 508 determines whether or not a PO-GW exists in the eNB that has sent the PDN connectivity request, based on PO-GW attribute information from the attribute information extraction section 509 (operation 604) and, if a PO-GW exists (operation 604: YES), determines whether or not offload is permitted, based on the offload permission information (operation 605). If offload is permitted (operation 605: YES), the P-GW selection section 508 selects the PO-GW of the base station with PO-GW (here, the base station 10) as a PDN gateway from the address list received from the DNS (operation 606), and sends a session creation request message to the S-GW. When a PO-GW does not exist (operation 604: NO), or when offload is not permitted (operation 605: NO), then the P-GW selection section 508 selects the P-GW of the mobile core network 20 as a PDN gateway from the address list received from the DNS (operation 607), and sends a session creation request message to the S-GW.

In this manner, according to the present example, the MME selects the IP address of a PDN gateway from the address list of P-GW and PO-GW, based on the PO-GW attribute information. Thereby, for the mobile terminal UE requesting to attach to the base station 10 with PO-GW, it is possible to determine that the PO-GW of the base station 10 will serve as a PDN gateway and thus to perform traffic offload. On the other hand, for the mobile terminal UE requesting to attach to a base station without PO-GW, it is determined that the P-GW of the mobile core network 20 will serve as a PDN gateway, and no traffic offload is performed. However, the offload permission function does not need to be provided.

4. Offload Method C (Third Example)

Figure 12:
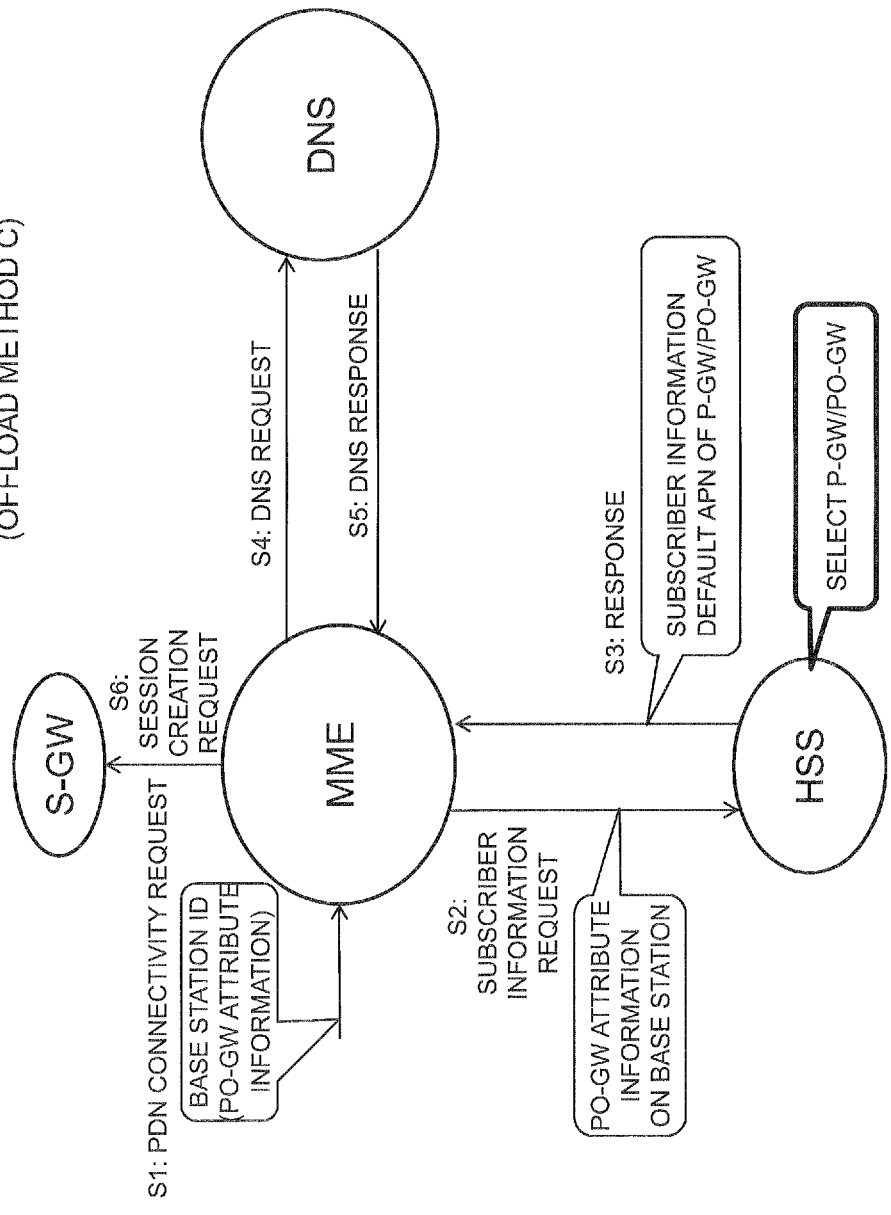
FIG. 12 is a partial sequence diagram to describe operation in a communication system according to a third example of the present invention.

FIG. 12 shows a partial sequence of the offload method C, which is a third example of the present invention. Individual sequence operations are identical to the operations S1 to S6 in FIGS. 3 and 4, and therefore the same reference signs are used. In the present example, a function of changing information on a PDN gateway based on PO-GW attribute information is added to the HSS.

C.1) Offload Control

Referring to FIG. 12, the MME, upon receiving a PDN connectivity request message containing a base station ID from a base station to which the mobile terminal UE has requested to attach (operation S1), sends a subscriber information request message containing PO-GW attribute information on the base station to the HSS (operation S2). The HSS, upon receiving the PO-GW attribute information, returns to the MME a response message in which a default PDN is set for the IP address/APN of the P-GW/PO-GW (operation S3). Subsequently, the MME sends a DNS request message to the DNS (operation S4) and receives a response message from the DNS (operation S5). The MME sends to the S-GW a session creation request message in which a default PDN is set for the IP address/APN of the P-GW/PO-GW (operation S6). Thereafter, the sequence operations S7 to S16 as described already are performed.

In this manner, according to the present example, a default PDN is set for the IP address/APN of the P-GW/PO-GW, based on the PO-GW attribute information from the MME. Thereby, for the mobile terminal UE requesting to attach to the base station 10 with PO-GW, it is possible to determine that the PO-GW of the base station 10 will serve as a PDN gateway and thus to perform traffic offload. On the other hand, for the mobile terminal UE requesting to attach to a base station without PO-GW, it is determined that the P-GW of the mobile core network 20 will serve as a PDN gateway, and no traffic offload is performed.

C.2) Configuration

To implement the above-described offload control on the network side, a function as described below is added to the HSS. However, the following example is assumed to include an offload permission function.

Figure 13:
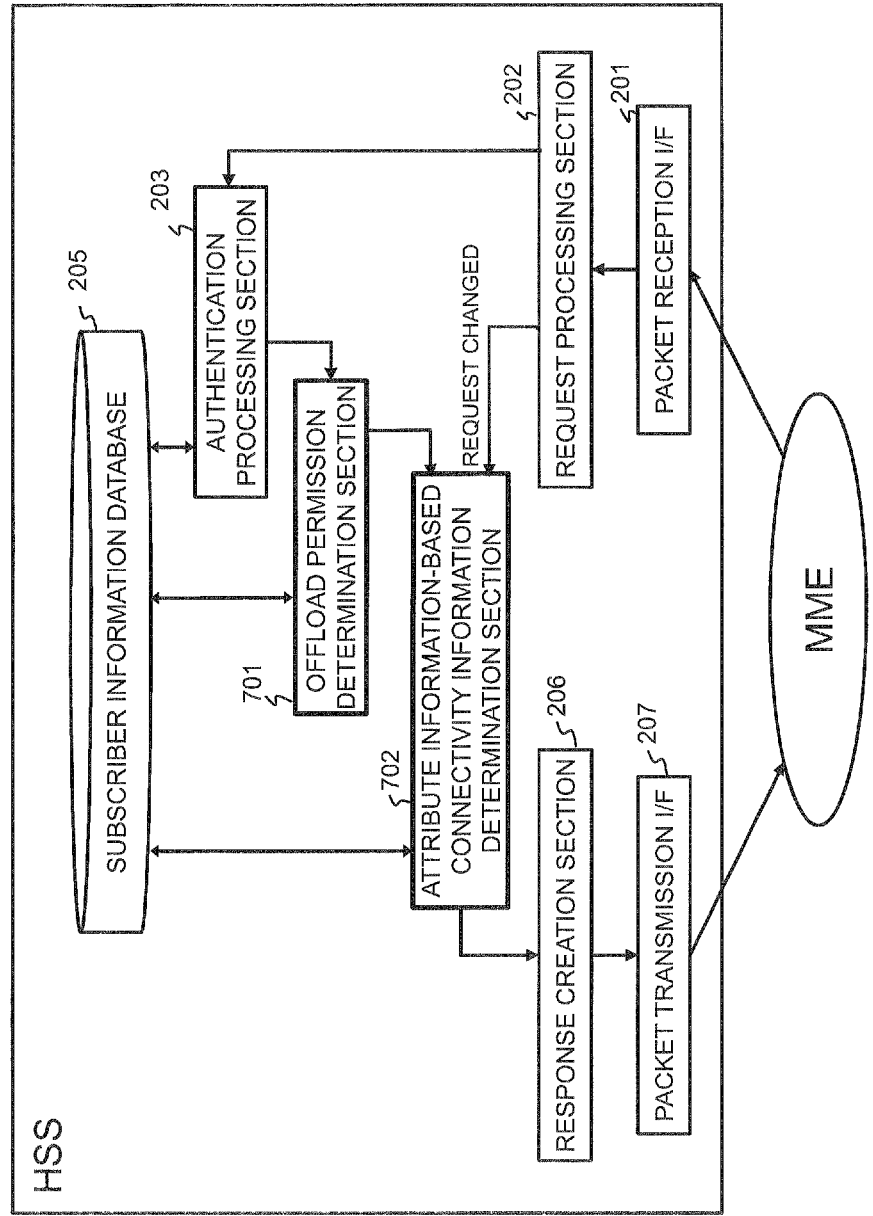
FIG. 13 is a block diagram showing a schematic functional configuration of a home subscriber server (HSS) in the communication system according to the third example.

Referring to FIG. 13, in the HSS, an attribute information-based connectivity information determination section 702 is provided in place of the connectivity information determination section 204 of the HSS shown in FIG. 6, and an offload permission determination section 701 having the same function as the offload permission determination section 208 in FIG. 6 outputs offload permission information to the connectivity information determination section 702. Constituents other than these are as described in FIG. 6 and therefore are denoted by the same reference signs, and a description thereof will be omitted. Operation of the attribute information-based connectivity information determination section 702 is as follows.

C.3) Connectivity Information Determination

Figure 14:
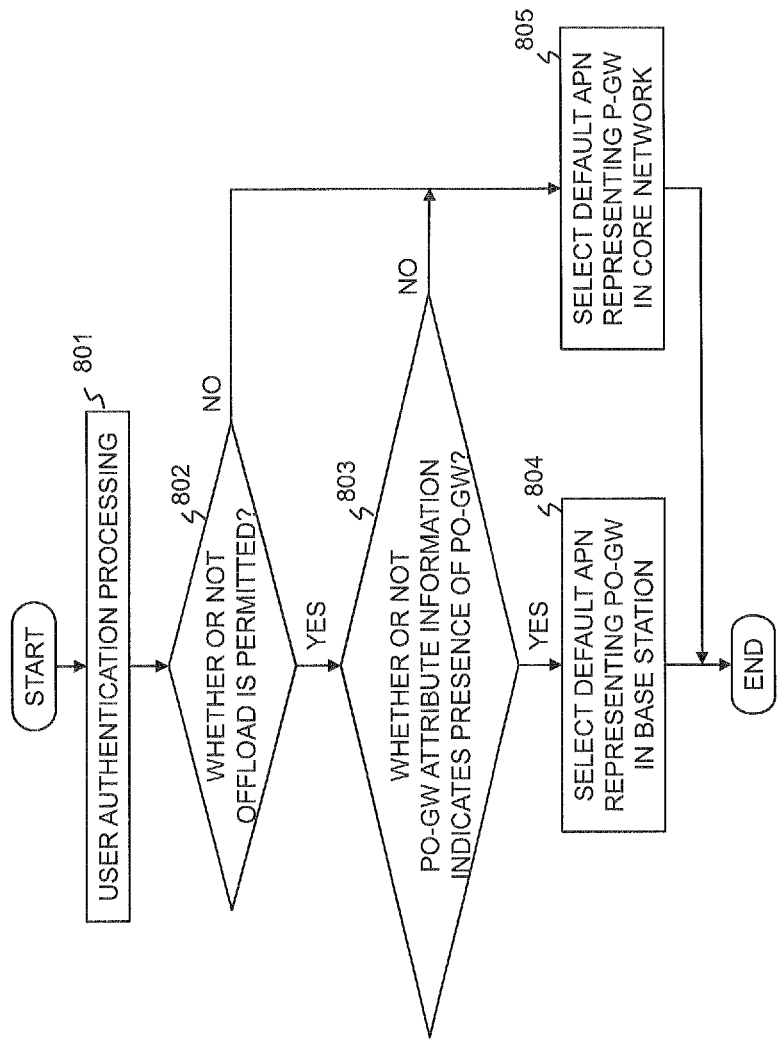
FIG. 14 is a flowchart showing operation of the HSS depicted in FIG. 13.

Referring to FIG. 14, when a subscriber information request is received from the MME, the authentication processing section 203 refers to the subscriber information database 205 and performs user authentication (operation 801), and the offload permission determination section 701 gives offload permission information about this subscriber to the connectivity information determination section 702. The connectivity information determination section 702 determines whether or not offload is permitted (operation 802) and, if offload is permitted (operation 802: YES), determines whether or not PO-GW attribute information in the subscriber information request message is indicative of a base station with PO-GW (operation 803). If the base station to which the mobile terminal UE will attach has a PO-GW (operation 803: YES), the connectivity information determination section 702 selects a default APN representing the PO-GW (operation 804), and the response creation section 206 creates a response message, which is sent back to the MME from the packet transmission interface 207. When offload is not permitted (operation 802: NO), or the base station to which the mobile terminal UE will attach has no PO-GW (operation 803: NO), then the connectivity information determination section 702 selects a default APN representing the P-GW of the mobile core network 20 (operation 805), and the response creation section 206 creates a response message, which is sent back to the MME from the packet transmission interface 207.

In this manner, a default PDN is set for the IP address/APN of the P-GW/PO-GW, based on the PO-GW attribute information from the MME, whereby for the mobile terminal UE requesting to attach to the base station 10 with PO-GW, it is possible to perform traffic offload. On the other hand, for the mobile terminal UE requesting to attach to a base station without PO-GW, it is determined that the P-GW of the mobile core network 20 will serve as a PDN gateway, and no traffic offload is performed. However, the offload permission function does not need to be provided.

INDUSTRIAL APPLICABILITY

The present invention is applicable to a system in which traffic offload for a mobile core network is performed at a base station.

REFERENCE SIGNS LIST

10 Base station
20 Mobile core network
30 Packet data network
101 Packet transmission/reception interface
102 Transfer section
103 Packet relay section
104 Packet offload section
105 Radio access control management section

The invention claimed is:

1. A communication system comprising:
a base station that includes a gateway for connecting a mobile terminal to an external network; and
a mobile network,
wherein the mobile network comprises:
a name resolution processor that resolves an Internet Protocol (IP) address of the gateway based on identification information of the base station; and
a control function provision processor that is configured to control access of the mobile terminal to the gateway in response to a request from the mobile terminal to connect to the external network via the base station.

2. The communication system according to claim 1, wherein the base station further includes a transfer processor that is configured to reroute the mobile terminal from a path connecting to the mobile network to a path connecting to the external network via the gateway.

3. The communication system according to claim 1, wherein the control function provision processor of the mobile network provides a PDN bearer connection control sequence for access to the gateway, wherein the PDN bearer connection control sequence originally allows the mobile terminal to access a PDN gateway in the mobile network.

4. The communication system according to claim 1, wherein the mobile network further includes a mobility management processor, and a subscriber information management processor,
wherein the control function provision processor is provided in at least one of the mobility management processor, the name resolution processor, and the subscriber information management processor.

5. The communication system according to claim 4, wherein the mobility management processor has a function of selecting a gateway IP address from an address list received from the name resolution processor, based on attribute information indicative of whether or not the base station has the gateway.

6. The communication system according to claim 4, wherein the subscriber information management processor has a function of setting the gateway as a default network gateway, based on attribute information indicative of whether or not the base station has the gateway.

7. The communication system according to claim 1, wherein the control function provision processor has a function of determining whether or not a mobile terminal is permitted to access the gateway, based on permission information set for each mobile terminal.

8. A communication control method for a communication system:
that comprises: a mobile network; and a base station with a gateway for connecting a mobile terminal in the mobile network to an external network, the communication control method comprising:
at the mobile network,
resolving an Internet Protocol (IP) address of the gateway based on identification information of the base station included in a request from the mobile terminal to connect to the external network via the base station; and
controlling access of the mobile terminal to the gateway in response to the request from the mobile terminal to connect to the external network via the base station.

9. The communication control method according to claim 8, wherein when the mobile terminal has accessed the gateway, the base station reroutes the mobile terminal from a path connecting to the mobile network to a path connecting to the external network via the gateway.

10. The communication control method according to claim 8, wherein the control function provision processor of the mobile network provides a PDN bearer connection control sequence for access to the gateway, wherein the PDN bearer connection control sequence originally allows the mobile terminal to access a PDN gateway in the mobile network.

11. The communication control method according to claim 8, wherein the mobile network further includes a mobility management processor and a subscriber information management processor,
wherein the control function provision processor is provided to at least one of the mobility management processor, the name resolution processor, and the subscriber information management processor.

12. The communication control method according to claim 11, wherein the mobility management processor selects a gateway IP address from an address list received from the name resolution processor, based on attribute information indicative of whether or not the base station has the gateway.

13. The communication control method according to claim 11, wherein the subscriber information management processor sets the gateway as a default network gateway, based on attribute information indicative of whether or not the base station has the gateway.

14. The communication control method according to claim 8, wherein the control function provision processor determines whether or not a mobile terminal is permitted to access the gateway, based on permission information set for each mobile terminal.

15. A base station for a communication system comprising a mobile network, the base station comprising:
a gateway that is configured to connect a mobile terminal to an external network; and
a control processor that is configured to control access of the mobile terminal to the gateway, in response to a control signal received from the mobile network,
wherein the mobile network resolves an Internet Protocol (IP) address of the gateway based on identification information of the base station included in a request from the mobile terminal to connect to the external network via the base station, and sends the control signal including the IP address of the gateway as a response to the request received from the mobile terminal.

16. The base station according to claim 15, wherein the control processor, in response to the control signal from the mobile network, changes paths connecting the mobile terminal to the external network between a first path via the mobile network and a second path via the gateway.

17. A communication control method for a base station in a communication system, comprising:
transmitting a request to a mobile network from a mobile terminal to connect to an external network via the base station; and
in response to a control signal received from the mobile network to the request for connection, controlling access of the mobile terminal to a gateway for connecting to the external network,
wherein the mobile network resolves an Internet Protocol (IP) address of the gateway based on identification information of the base station included in a request from the mobile terminal to connect to the external network via the base station, and sends the control signal including the IP address of the gateway as a response to the request received from the mobile terminal.

18. A communication control device for a communication system, comprising a mobile network and a base station that includes a gateway for connecting a mobile terminal to an external network,
wherein the communication control device comprises:
a name resolution processor that is configured to resolve an Internet Protocol (IP) address of the gateway based on attribute information of the base station included in a request from the mobile terminal to connect to the external network via the base station; and
a control function provision processor that controls access of the mobile terminal to the gateway in response to the request from the mobile terminal to connect to the external network via the base station.

19. The communication control device according to claim 18, wherein the control function provision processor provides a PDN bearer connection control sequence for access to the gateway, wherein the PDN bearer connection control sequence originally allows the mobile terminal to access a PDN gateway in the mobile network.

20. The communication control device according to claim 18, further comprising: a mobility management processor that selects a PDN gateway IP address from an address list received from the name resolution processor, based on attribute information indicative of whether or not the base station has the gateway.

21. The communication control device according to claim 18, further comprising: a subscriber information management processor that sets the gateway as a default network gateway, based on attribute information indicative of whether or not the base station has the gateway.

22. The communication control device according to claim 18, wherein the control function provision processor determines whether or not a mobile terminal is permitted to access the gateway, in accordance with permission information set for each mobile terminal.

* * * * *